United States Patent [19]
Lombardi et al.

[11] Patent Number: 6,070,107
[45] Date of Patent: May 30, 2000

[54] WATER SOLUBLE RAPID PROTOTYPING SUPPORT AND MOLD MATERIAL

[75] Inventors: John Lang Lombardi; Dragan Popovich; Gregory John Artz, all of Tucson, Ariz.

[73] Assignee: Stratasys, Inc., Eden Prairie, Minn.

[21] Appl. No.: 09/082,064

[22] Filed: May 20, 1998

Related U.S. Application Data

[63] Continuation-in-part of application No. 08/825,893, Apr. 2, 1997.
[51] Int. Cl.$^7$ .................................................... G06F 19/00
[52] U.S. Cl. .......................................... 700/119; 264/40.7
[58] Field of Search .................................. 264/40.7, 308; 427/389.7; 700/119, 182

[56] References Cited

U.S. PATENT DOCUMENTS

| | | | |
|---|---|---|---|
| Re. 35,334 | 9/1996 | Moore et al. | 264/489 |
| 4,078,599 | 3/1978 | Makiguchi et al. | 161/41 |
| 4,753,987 | 6/1988 | Dean | 525/66 |
| 4,826,926 | 5/1989 | Lutz | 525/412 |
| 4,944,965 | 7/1990 | Luxon et al. | 427/389.7 |
| 5,013,514 | 5/1991 | Azzani et al. | 264/512 |
| 5,121,329 | 6/1992 | Crump | 364/468 |
| 5,136,515 | 8/1992 | Helinski | 364/468 |
| 5,158,130 | 10/1992 | Sahari | 164/528 |
| 5,340,433 | 8/1994 | Crump | 156/578 |
| 5,503,785 | 4/1996 | Crump et al. | 264/40.7 |
| 5,649,277 | 7/1997 | Greul et al. | 419/2 |

FOREIGN PATENT DOCUMENTS

WO 95 26864  12/1995  WIPO .

OTHER PUBLICATIONS

T. L. Wei, Y. H. Huang and J. T. Hu, "Computer Simulation in the Injection Moulding of a Thermoplastic Fuel Rail by the Lost–Core Technique," *Composite Polymers*, vol. 5, No. 4, pp. 257–269 (1992).

H. Keskkula and D. R. Paul, "Miscibility of Polyethyloxazoline with Thermoplastic Polymers," *Journal of Applied Polymer Science*, vol. 31, pp. 1189–1197 (1986).

J.–L. G. Pfenning, H. Keskkula, and D. R. Paul, "Water Extraction of Polyethyloxazoline from Miscible and Immiscible Polymer Blends," *Journal of Applied Polymer Science* vol. 32, pp. 3657–3673 (1986).

Marcus, Harris L., et al., "Solid Freeform Fabrication Finds New Application," *Advanced Materials & Processes*, pp.28–35 (Sep. 1993) vol. 144, No. 3.

P. Järvelä, A. Jaala–Siuko, and H. Hylhä, "Greencast–Process, A New Ceramic Technology for Plastics Processing," *Advanced Performance Materials* vol. 3, pp. 171–182 (1996).

*Primary Examiner*—William Grant
*Assistant Examiner*—Steven R. Garland
*Attorney, Agent, or Firm*—Kinney & Lange, P.A.

[57] ABSTRACT

A water-soluble thermoplastic composition for three-dimensional modeling comprising poly(2-ethyl-2-oxazoline) is disclosed. The composition in the form of an extrudable object may be extruded by an extrusion apparatus in a programmed pattern onto a base as a ribbon of liquified polymer to create a support structure for a prototype object or to create a water-soluble polymeric element.

11 Claims, 2 Drawing Sheets

WATER SOLUBLE RAPID PROTOTYPING SUPPORT AND MOLD MATERIAL

CROSS REFERENCE TO A RELATED APPLICATION

This is a continuation in part of Ser. No. 08/825,893 filed Apr. 2, 1997 which is incorporated herein by reference.

BACKGROUND OF THE INVENTION

This invention relates to thermoplastic polymer materials for the preparation of three-dimensional prototypes or models. Prototypes of parts are made and used in testing in a wide-variety of industries, such as the automobile, aerospace, and biomedical prostheses manufacturing industries. After successful testing the prototypes of parts, a mold of the prototype can be made and the part can be manufactured on a mass production basis.

There are three ways of making prototypes. One method involves simply making a mold of the part, making the prototype, and then testing the prototype. However, this method requires the cost of making a mold, which itself can be extremely expensive and time-consuming. Moreover, this method may require numerous molds to be made on a trial and error basis until a successful part has been designed that sufficiently passes the required testing.

A second method of making prototypes involves sculpting a three-dimensional prototype of a particular shape from a block work piece. In this method, the prototype is drawn either manually or using computer-aided design (CAD) techniques, and the prototype is formed by removing material from a block work piece. The part can be further machined either manually or using computer-aided machining (CAM) techniques. However, this method can also be a costly and time-consuming process because it may require repeated iterations until a desired prototype is made.

A third method that has been developed involves the formation of a three-dimensional prototype by depositing multiple layers of a material in a fluid state onto a base. The fluid solidifies to define the prototype element. In general this method is often termed freeforming in the prior art. For example, such a method is taught in U.S. Pat. No. 5,340,433, and U.S. Pat. No. 5,121,329, both issued to S. Scott Crump and assigned to Stratasys, Inc. incorporated herewith by reference. In this method, a layer of the fluid material solidifies and then another layer of fluid material is deposited over the preceding layer. The thickness of each layer is controlled by the distance between the tip of the dispensing head and the preceding layer. However, there are a number of disadvantages to the method and apparatus taught in this third method because only certain types of materials can be suitably used to make the prototypes, such as waxes having low melt viscosity and strength. Thermoset materials may be used to try to improve strength and toughness. In any event, this prior art deposition method may not produce durable prototypes made from high performance engineering polymers and composites.

There is a clear need for a method and apparatus that can make stronger and tougher prototypes made of engineering polymers and composites having high melt viscosity and long chain lengths. Such a method and apparatus is disclosed in U.S. Ser. No. 08/825,893, filed Apr. 2, 1997, which is incorporated herein by reference.

As noted in U.S. Ser. No. 08/825,893, materials for high pressure fused deposition include polyaryletherketone (PEEK® produced by Victrex), polmethylmethacrylate (PMMA® produced by DuPont), polycarbonate (Lexan® made by General Electric Plastics), thermoplastic polyurethane (Pellethane® made by Dow Chemical), and polylatic acid/polyglycolic acid block copolymer (a bio-absorbable material made by a Biomet joint venture). Fused deposition of fiber reinforced grades of engineering polymers and composites, for example PEEK® and Lexan® can also be used for the invention disclosed in U.S. Ser. No. 08/825,893. Moreover, prototypes can be made in accordance with that invention using fiber reinforcement. For example, carbon fiber reinforced PEEK® materials had a tensile strength of over 36000 psi, exhibited a very high fracture toughness and demonstrated highly anisotropic mechanical properties whereas unreinforced materials did not.

Thus, there is a clear need for strong materials that can be used in a method for making prototypes, and in particular materials for the method involving the depositing of multiple layers in a fluid state onto a base. More specifically, there is a need for strong thermoplastic polymers that can be easily melt extruded by an extrusion freeforming apparatus in layer form, and which then solidify upon cooling so that complicated shaped parts can be freeform fabricated by precisely and sequentially depositing polymer layers upon one another until the desired component is produced. There is also a need for strong materials that can be used as a support material for use in an extrusion freeforming apparatus that prevents the sagging of deposited molten, prototype material layers before cooling and solidification. Support materials are particularly important when fabricating complex geometry, dimensionally accurate prototypes having numerous overhangs, or internal cavity features.

SUMMARY OF THE INVENTION

In the present invention, a unique thermoplastic polymer material, i.e., poly(2-ethyl-2-oxazoline) (referred to hereafter as "PEO"), is used as a polymer layer material as well as a support material in a freeform fabrication process. More specifically, PEO is melt extruded by a freeforming apparatus in layer form. The PEO layers solidify upon cooling and complicated shaped parts can be freeform fabricated by precisely and sequentially depositing polymer layers upon one another until the desired component is produced. Thus, prototypes can be directly freeformed by an extrusion freeforming apparatus using PEO as a raw material.

In addition, in the present invention, PEO is used as a support material for use in rapid prototype processes such as extrusion freeform fabrication or a fused deposition modeling process. In particular, many parts which are fabricated by these processes have complicated overhang geometries which require the use of a support material that prevents the sagging of deposited molten, prototype material layers before cooling and solidification.

It has been discovered that a major advantage of PEO over other materials is that PEO is a high strength, rigid thermoplastic polymer that is easily and accurately extruded and has a good slump resistance at temperatures less than about 200° C. PEO also has the added benefits in that it is essentially an amorphous polymer that does not undergo significant shrinkage upon solidification. Polyethylene oxide, another commercially available water soluble thermoplastic, on the other hand, undergoes approximately 15–20% shrinkage due to crystallization upon solidification. Shrinkage on the order of this magnitude puts a great deal of stress and may induce warpage in freeformed support material layers. PEO also has high degree of interlayer adhesion when freeformed. Polyethylene oxide has negligible interlayer adhesion when freeformed. A major benefit of using PEO is that it has all of the above properties coupled with high water solubility. Rapid prototype parts can therefore be fabricated using PEO as a support material and the PEO support can be easily washed away with water from the completed prototype part without employing toxic and environmentally detrimental solvents, which may also dissolve the desired polymer prototype part. It is believed that PEO is the only commercially available non-ionic water soluble thermoplastic material (sold under the tradename Aquazol by Polymer Chemistry Innovations Inc., of Tucson, Ariz.) that has all of the above properties. PEO is also very tacky and many materials readily adhere to it, thereby making PEO an excellent rapid prototyping support material.

Furthermore, PEO is not as hygroscopic compared to other commercial water soluble polymers including polyvinyl alcohol and polyethylene oxide, and thus PEO possess significantly greater dimensional stability in ambient humid atmosphere compared to these other polymers. Moreover, PEO can be extruded at higher temperatures without decomposing and having its melt viscosity change with time.

In another aspect of the present invention, PEO is used as a fugitive mold material for casting ceramic slurries, e.g. for ceramic green body fabrication, and also preparing polyurethane or epoxy parts by pouring reactive mixtures of these liquid precursor materials into a mold which is precision machined from bulk PEO stock. Thus, in accordance with the present invention, parts can be subsequently extracted from the mold by placing the entire part in a water bath after the slurry or precursors are cured so that the water dissolves the PEO and leaves the fabricated polymer or green ceramic part behind.

This unique polymer PEO, not heretofore suggested for use as a extrusion freeform fabrication material, greatly facilitates the extrusion freeform fabrication of parts, as well as for casting ceramic slurries.

These and other objects, advantages and features of the present invention will be more fully understood and appreciated by reference to the detailed description which follows.

BRIEF DESCRIPTION OF THE DRAWING

In the detailed description as follows, reference will be made to the drawings comprised of the following figures.

DETAILED DESCRIPTION OF THE PREFERRED EMBODIMENTS

PEO as Cylindrical Feed Rod Material

In a preferred embodiment of the present invention, the specific thermoplastic polymer material poly(2-ethyl-2-oxazoline), i.e., PEO, was prepared as a slug in the form of a cylinder having the following dimensions: 0.3875 inches in diameter by 5.50 inches in length.

Thereafter, the slug was inserted into an apparatus, the type described in co-pending Ser. No. 08/825,893, and extruded as a fine ribbon by said apparatus to form a prototype mechanical element or object.

That is, in general, the cylindrical rods are next extruded at high temperature and high pressure from a discharge nozzle as a thin ribbon of material onto a platform. The platform is programmed to move in three dimensions as the ribbon is discharged therefrom. Thus, as the platform moves under the nozzle, layer upon layer of material is deposited to form the prototype element. The utilization of a special cylinder and nozzle construction in combination with heaters enables the use of materials that have structural integrity such as polycarbonates, acrylics, silicon nitrides and ABS to form the prototype elements. As a result, the prototype elements made by the process have physical characteristics similar to or the same as final commercial elements. Thus, testing of complex component parts under final manufacturing criteria or conditions with prototype elements is possible. As a result, various intermediate prototyping steps are avoided.

Figure 1:
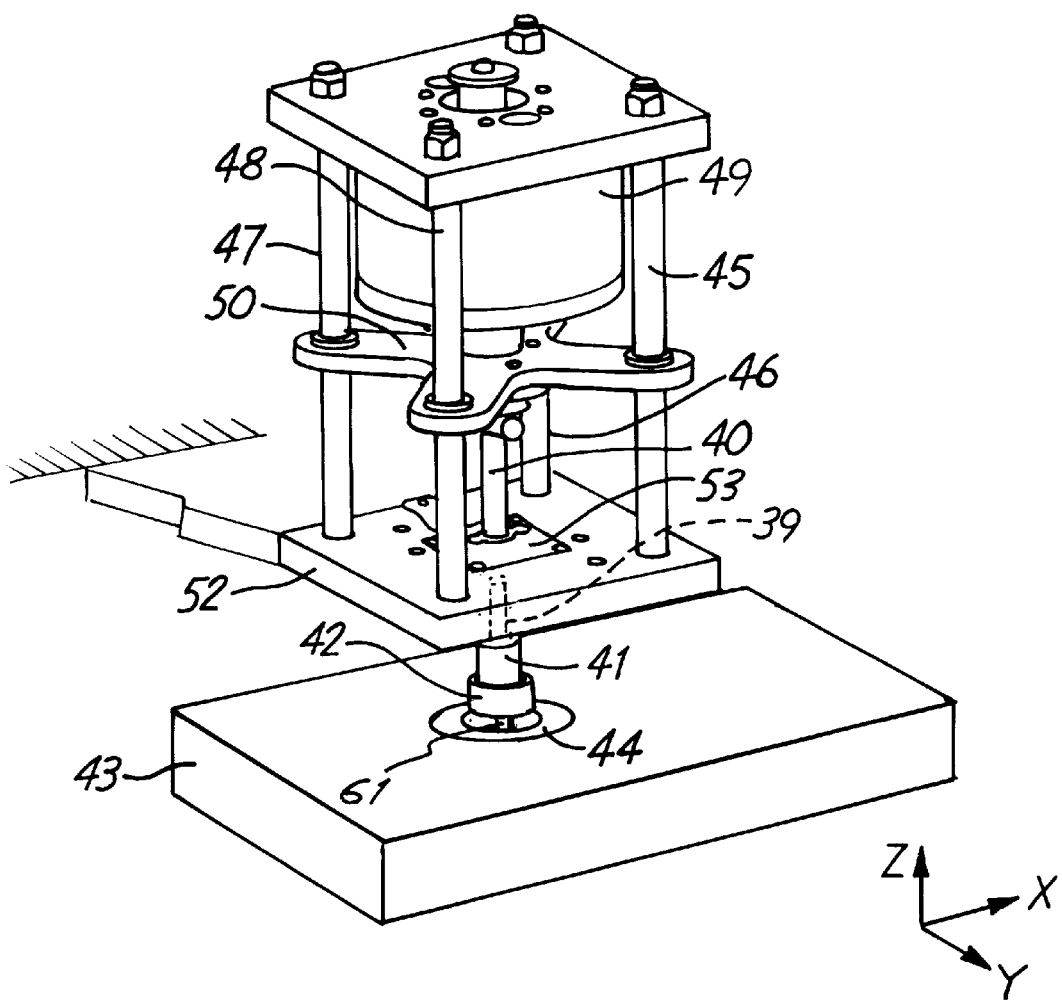
FIG. 1 is a schematic illustration of the extrusion press of the present invention.

FIG. 1 depicts an embodiment of the device in partial schematic view. The device or apparatus of the invention is an improvement over prior art prototyping devices and the features described in FIG. 1 are incorporated in place of and in addition to features of prior art apparatus. Specifically, in prior art devices, the material used to make the three-dimensional model or element was typically a thermoplastic ribbon that was fed by rollers through a heated nozzle. It operated in the range of 120° C. and 50–60 psi thus limiting the materials which could be used to make prototyping elements. The subject matter of the invention operates at temperatures up to 410° C. and at pressures of 5 to 10 kpsi. Thus, the range of materials which may be used for prototyping is increased. However, all materials are not necessarily useful in the process, and the choice of materials also forms a part of the invention as discussed above and below.

Referring to FIG. 1, a cylindrical feed rod 39 of polymeric material is pushed by a piston 40 into a cylinder 41 with a heated head 42 and a discharge nozzle 61. A discharge ribbon of extruded material flows onto a moving, heated platform 43 to form a prototype or mechanical element 44. The extruder system is a four post 45, 46, 47, 48 screw press driven with a massive Dynaserv® servo motor 49. This motor 49 is capable of very powerful and precise movements. The Dynaserv® motor drives a 1.25" precision ground ball screw. The end of the screw is secured on a plate 50 which slides on the four posts 45–48. This plate 50 also prevents any axial misalignment of the screw and houses a load cell. The end of the screw is fitted with a cup for attaching the extrusion piston 40. The bottom plate 52 of the press has a keyhole shaped mounting insert 53 for the extrusion cylinder 41. A servomotor (not shown) for platform 43 is controlled by a four axis controller card in a personal computer. This platform system is depicted in general in U.S. Pat. No. 5,340,433 or No. 5,121,329.

Figure 2:
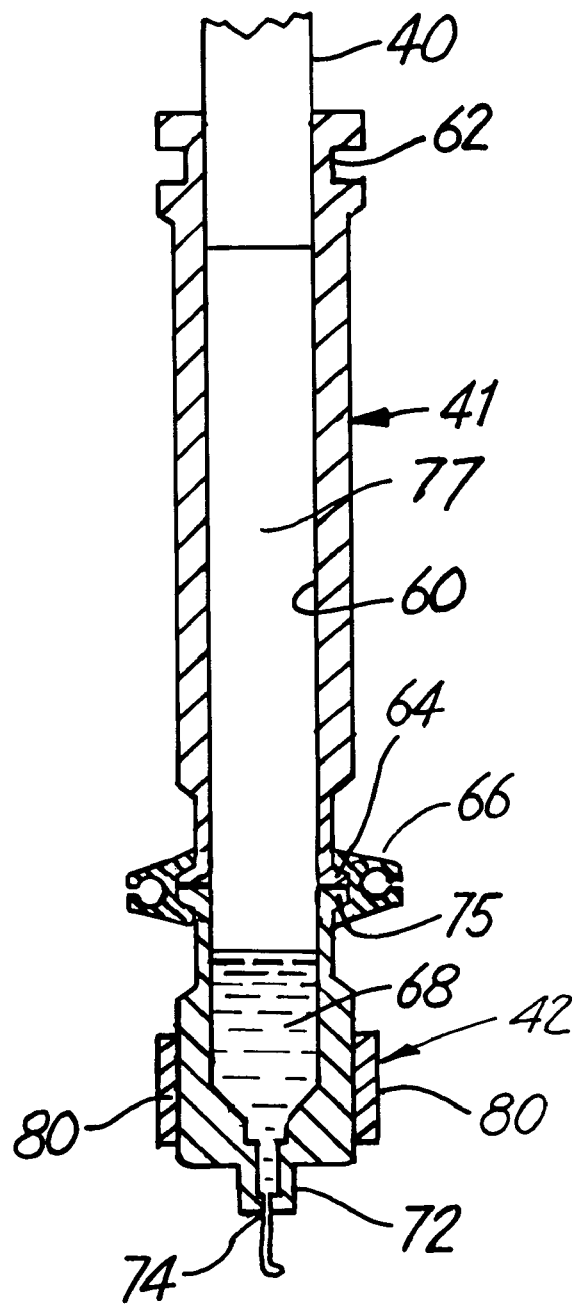
FIG. 2 is a cross sectional view of the cylinder and head for the batch extrusion component of the apparatus of the invention.

Referring next to FIG. 2, there is depicted the piston 40, cylinder 41 and head 42 which form an integral part of the invention. Specifically, the cylinder 41 has a smooth sided, longitudinal thoughbore 60 of uniform diameter. The top end of cylinder 41 includes a circumferential groove 62 to facilitate mounting in plate 52. The bottom end of cylinder 41 includes a circumferential rib 64 which cooperates with a clamp 66. The head 42 includes a bore 68 with a diameter equal to that of bore 60 and co-axial therewith. The bore 68 connects with a reduced diameter nozzle 60 having a discharge orifice 74. Orifice 74 is 0.024" diameter or less.

Head 42 has an upper rib 75 which coacts with clamp 66. Bore 60, 68 has about 0.75" diameter. Cylinder 41 has a longitudinal dimension of about 6 inches or more. Maintenance of a smooth surfaced bore 60, 68 along the entire length is highly preferred. The bore 60 and bore 68 should also be uniform in diameter. Also, the diameter of the polymer rod 77 should be approximately equal to the diameter of bores 60, 68.

A circumferential heater band 80 surrounds the head 42. Head 42 has a uniform outside diameter and a generally thicker wall to define a heated mass so that polymer within the head 42 is liquified in the process. That is, the polymer rod in the bore 60 is heated and softened and subjected to pressure while the polymer in the bore 68 is liquified for extrusion.

In operation of the process, the polymer feed rod 77 should be maintained in solid form to the maximum extent possible in bore 60. Heating generally takes place only at the head 42 to avoid polymer breakdown. Tip 72 configuration can be changed to control ribbon discharge volume, width, etc. Importantly, the tip 72 should be an integral part of the head 42. Thus a three piece design (cylinder 41, head 42, clamp 66) is preferred. More specifically, the steps performed comprised the steps of:

a) positioning a cylindrical rod of said polymer material comprising PEO in a cylindrical housing having a throughbore with a diameter substantially equal to the diameter of the cylindrical rod, said housing being connected with and attached to a discharge head member having a uniform diameter bore connecting with the throughbore, a discharge tip, a reduced diameter discharge opening in the tip, and a circumferential heater to liquefy the material in the bore;

b) compressing the material in the housing with a piston while simultaneously liquefying the material in the head member to thereby discharge a ribbon of material from the tip;

c) transporting the platform in the x and y directions while discharging material thereon to form the cross sectional shape of the element; and d) transporting the housing and head member in the z direction simultaneously to form the element in elevation The extrusion occurred in multiple layers of a ribbon of the material discharged from the nozzle of the apparatus layer upon layer so as to form the object.

The polymer material comprising PEO can be used as a support for free formed layers of other material. Further, the method of the present invention can be used to make an article of manufacture that is a free form three-dimensional object comprising a plurality of layers of a ribbon of PEO. The present invention further includes a thermoplastic polymer in the form of an extrudable object comprising a slug of PEO.

At least one inorganic filler can be added to the polymer material comprising PEO. The inorganic filler can be comprised of at least one soluble salt. Examples of soluble salts include alkali or alkaline earth halides (e.g., sodium chloride, magnesium chloride), or their sulfates (e.g., magnesium sulfate).

The PEO can be blended with at least one inert filler. The inert filler can be selected from the polymer filler group consisting of calcium carbonate, glass spheres, graphite, carbon black, carbon fiber, glass fiber, talc, wollastonite, mica, alumina, silica, and silicon carbide.

The typical extrusion temperature of the polymer in the head member can be in the range of about 120–410° C., and is preferably in the range of 150–200° C., and most preferably approximately 175° C. The rod is compressed and extruded at a pressure of about 200–1,000 psi, and is preferably compressed and extruded at a pressure in a range of about 500–700 psi.

Tensile test bar specimens were extrusion free-formed in accordance with ASTM D638 testing standard using both 200,000 and 50,000 molecular weight (MW) Aquazol feedrods. These specimens were tested and compared with objects made using similar apparatus. The various objects, i.e., prototype mechanical elements, were then tested and compared one to the other and the test results are reported below.

Mechanical Testing

Mechanical tests were carried out on polymer resins manufactured into test configurations in accordance with the same extrusion freeforming fabrication process previously referred to above. Samples were tensile tested to determine their strengths, moduli and elongation to break values. The polymers tested were the PEO of the present invention, ABS and Nylon-11. The test results are shown in Table 1 along with reported test results of other materials. In addition to mechanical testing, sample tensile properties were measured and compared to reported properties of the other materials.

Tensile Testing

Tensile tests were performed as close to standard ASTM D638 as possible. Tensile bars were free formed and tested without further machining or modification. The test specimen geometry was of the typical "dog bone" shape. Machining the bars resulted in damage to the gauge section of some materials. Since tensile testing is very sensitive to notches, machining was not possible.

Samples were tested along the writing direction. This simply denotes the bead direction with respect to the mechanical testing equipment. The equipment used was a model 1011 Instron apparatus with a load cell capacity of 1000 pounds. The 1011 Instron apparatus uses vertical specimen loading and wedge-action type grips. The cross head speed for all specimens was 0.2 inches per minute.

Tensile moduli, strength, 0.2% yield strength, and elongation or strain to fracture were calculated.

Discussion of Results

The values contained in Table I resulted from averaging the test samples' measured properties of interest.

The mechanical properties of the materials prepared in this work are compared with other free formed polymer materials in Table I. The PEO is more than 30 percent stronger and between 2 to 3 times stiffer than any of the presently available water soluble polymer materials. These properties represent a substantial improvement in the art.

TABLE I

Comparison of Materials Properties from Commercial SFF Systems

| System | Material | Grade | $\sigma$ tensile (psi) | E tensile (ksi) | $\epsilon$ break (%) |
|---|---|---|---|---|---|
| 3D | Epoxy | XB5170 | 2,400 | 130 | 9 |
| DTM | Nylon-11 | LN4000 | 5,200 | 200 | 32 |
| Stratasys | ABS | | 5,000 | 360 | 50 |
| ACR | PEEK | 450 FC | 36,374 | 1195 | 3 |
| ACR | Polyethylene oxide | Union Carbide Polyox WSR-N80 (200,000 MW) | 3,000 | 40–70 | 500 |
| ACR | PEO | Aquazol 200 (200,000 MW) | 4,000 | 230 | 1.9 |
| ACR | PEO | Aquazol 50 (50,000 MW) | 900 | 150 | 0.9 | wherein MW = molecular weight
SFF = Solid Free-Forming
3D = 3D Systems of Valencia, California
DTM = DTM Corporation of Austin, Texas
Stratasys = Stratasys of Eden Prairie, Minnesota
ACR = Advanced Ceramics Research, Inc. of Tucson, Arizona PEO in Filament Applications PEO has been found to be not only useful as cylindrical feed rod material, but also as filament feed material in yet another preferred embodiment of the present invention. It has been discovered that PEO is an excellent filament feed material that can be freeformed using fuse deposition modeling processes taught in U.S. Pat. No. 5,340,433 and U.S. Pat. No. 5,121,329 because it is water soluble and can be washed away easily, is a stiff material, is thermally stable, and adheres well to other materials, including other layers of PEO. Therefore, PEO filament feedstock can be used as a support material in fuse deposition modeling of polymer prototype parts.

Thus, the present invention includes a method for forming prototype mechanical elements from at least one polymer material on a platform comprising the steps of:

a) placing filament containing said polymer material comprising poly(2-ethyl-2-oxazoline) in a cylindrical housing having a throughbore with a diameter substantially equal to the diameter of the filament, said housing being connected with and attached to a discharge head member having a uniform diameter bore connecting with the throughbore, a discharge tip, a reduced diameter discharge opening in the tip, and a circumferential heater to liquefy the material in the bore;

b) liquefying the material in the head member to thereby discharge a ribbon of material from the tip;

c) transporting the platform in the x and y directions while discharging material thereon to form the cross sectional shape of the element; and d) transporting the housing and head member in the z direction simultaneously to form the element in elevation.

The polymer material comprising PEO can be used as a support for free formed layers of other material. Further, the method of the present invention can be used to make an article of manufacture that is a free form three-dimensional object comprising a plurality of filament layers of PEO. The present invention further includes a thermoplastic polymer in the form of an extrudable object comprising a filament of PEO.

Further it has now been discovered that PEO can be blended with a variety of polar thermoplastics, fillers, and plasticizers to modify its physical properties. These additives enable the PEO polymer to be extruded into tough, flexible geometries (including Stratasys Fused Deposition Modeller (FDM) filament form).

The polymer material comprising PEO can also include an inorganic filler, which in turn can be comprised of at least one soluble salt.

The PEO can be blended with at least one inert filler. The inert filler can be selected from the polymer filler group consisting of calcium carbonate, glass spheres, graphite, carbon black, carbon fiber, glass fiber, talc, wollastonite, mica, alumina, silica, and silicon carbide.

The typical extrusion temperature of the polymer in the head member can be in the range of about 120–410° C., and is preferably in the range of 150–290° C., and most preferably approximately 180° C.

As a further example, the modulus of PEO can be decreased by the addition an alcohol plasticizer. Preferably the alcohol plasticizer is in an amount of 0.5 to 45 wt. % alcohol plasticizer to the PEO. Preferred alcohol plasticizers are water soluble and have structures composed of multiple hydroxyl groups (i.e., ethylene glycol, glycerol, or 200–10,000 MW Union Carbide PEG polyethylene glycols). 600 MW PEG is a preferred plasticizer due to its combination of low viscosity and low melting point. These plasticizers decrease the rigidity of PEO and enable it to be drawn into flexible filament feedstock that can be extruded by a Stratasys Fused Deposition Modeller (FDM). Furthermore, PEG plasticizers are miscible with water and are believed to enhance the overall water solubility and dissolution rate of the freeformed plasticized PEO material.

PEG plasticized PEO filament is highly tacky in humid atmosphere, which makes it difficult to uniformly spool as feed material through the Stratasys FDM dispensing head. Consequently, its formulation must be modified to decrease its tackiness as well as enhance its strength. Addition of 0.25–5 wt. % of polar wax has been shown to decrease filament tackiness. The polar wax can be selected from the group consisting of compounds having alcohol, acid, ester or amide functional groups. Thus, in the present invention it is contemplated that among the various compounds that can be used include, but are not limited to amide waxes, including oleamide and stearamide, stearic acid, and stearate/oleate esters. In particular, an ethoxylated fatty alcohol known under the tradename of Unithox 420 (Baker Petrolite Corporation, Tulsa, Okla.) has been found to reduce filament tackiness. The structure of Unithox 420 is given below:

$$CH_3CH_2(CH_2CH_2)_xCH_2CH_2(OCH_2CH_2)_yOH$$

where x/y ranges from 4–10, but the preferred ratio is about 5.2

Unithox 420 is believed to be uniformly soluble in the PEG plasticized PEO at elevated temperatures but phase separates from the mixture and migrates to the extruded filament surface upon cooling. This leaves a slightly waxy, low tackiness surface upon the cooled filament.

Polar homopolymers and copolymers containing polar functional groups, either pendant to or present in its main chain, can be added to PEG plasticized PEO formulations in order to increase the strength and toughness of the filament. Examples of polar homopolymers and copolymers that can be added to the PEG plasticized poly(2-ethyl-2-oxazoline) include Nylon 12, amorphous nylon copolymer of terephthalamide/isophthalamide/hexamethylenediamine, Nylon 6/Nylon 12 copolymer, polyvinylformal, polyvinylbutyral, and polyesters. These polymers also decrease the tendency of the filament to fracture when it is fed through the rollers on the Stratasys FDM head. Examples of polyamides include Nylon 12 (Grilamid L16) and an amorphous nylon copolymer of terephthalamide/isophthalamide/hexamethylenediamine (Grivory G16), both manufactured by EMS American Grilon Inc., Sumter, S.C., and Nylon 6/Nylon 12 Copolymer (Vestamelt 430P-1), made by Huls/Creanova Inc., Somerset, N.J. These polyamides can be present in amounts ranging from 0.5–35 wt. % based upon the total mass of PEG plasticized PEO.

Specific examples of water soluble plasticized PEO compositions that can be extruded into flexible filament and successfully extruded through a Stratasys FDM head are presented below:

| EXAMPLE I | |
|---|---|
| Calcium Carbonate* | 22.3 wt. % |
| PEO (200K MW) | 65.0 |
| PEG (600 MW) | 8.6 |
| Grilamid L16 | |
| EXAMPLE II | |
| Calcium Carbonate* | 59.1 |
| PEO (50K MW) | 26.9 |

-continued

| | |
|---|---|
| PEG (600 MW) | 11.1 |
| Vestamelt 430P-1 | 2.9 |
| EXAMPLE III | |
| Calcium Carbonate* | 26.1 |
| PEO (200K MW) | 57.5 |
| PEG (600 MW) | 10.–0 |
| Grilamid L16 | 4.9 |
| Unithox | 1.5 |
| EXAMPLE IV | |
| Calcium Carbonate* | 22.4 |
| PEO 50K MW) | 60.9 |
| PEG (600 MW) | 6.9 |
| Grivory G-16 Nylon | 6.7 |
| Unithox 420 | 3.1 |
| EXAMPLE V | |
| CaCO$_3$ | 59.25 |
| PEO (200K MW) | 26.25 |
| PEG (600 MW) | 10.80 |
| Polyvinylbutyral** | 3.70 |

*Calcium Carbonate filler was a submicron precipitated powder known under the tradename of Multifex MM 1007/056, made by Specialty Minerals Inc., Adams, MA.
**Polyvinylbutyral used is known under the tradename Butvar B-98, made by Monsanto Company of St. Louis, MO.

Those of skill in the art will recognize various changes to the methods, materials, and apparatus are possible without departing from the spirit and scope of the invention. Thus, the invention is to be limited only by the claims and equivalents thereof.

What is claimed is:

1. A method for forming prototype mechanical elements from at least one polymer material on a platform comprising the steps of:
    a) positioning a cylindrical rod of said polymer material comprising poly(2-ethyl-2-oxazoline) blended with at least one inert filler in a cylindrical housing having a throughbore with a diameter substantially equal to the diameter of the cylindrical rod, said housing being connected with and attached to a discharge head member having a uniform diameter bore connecting with the throughbore, a discharge tip, a reduced diameter discharge opening in the tip, and a circumferential heater to liquify the material in the bore;
    b) compressing the material in the housing with a piston while simultaneously liquefying the material in the head member to thereby discharge a ribbon of material from the tip;
    c) transporting the platform in the x and y directions while discharging material thereon to form the cross sectional shape of the element; and
    d) transporting the housing and head member in the z direction simultaneously to form the element in elevation.

2. The method of claim 1 wherein the inert filler is selected from the polymer filler group consisting of calcium carbonate, glass spheres, graphite, carbon black, carbon fiber, glass fiber, talc, wollastonite, mica, alumina, silica, and silicon carbide.

3. A method for forming prototype mechanical elements from at least one polymer material on a platform comprising the steps of:
    a) placing filament containing said polymer material comprising poly(2-ethyl-2-oxazoline) blended with at least one inert filler in a cylindrical housing having a throughbore with a diameter substantially equal to the diameter of the filament, said housing being connected with and attached to a discharge head member having a uniform diameter bore connecting with the throughbore, a discharge tip, a reduced diameter discharge opening in the tip, and a circumferential heater to liquefy the material in the bore;
    b) liquefying the material in the head member to thereby discharge a ribbon of material from the tip;
    c) transporting the platform in the x and y directions while discharging material thereon to form the cross sectional shape of the element; and
    d) transporting the housing and head member in the z direction simultaneously to form the element in elevation.

4. The method of claim 3 wherein the inert filler is selected from the polymer filler group consisting of calcium carbonate, glass spheres, graphite, carbon black, carbon fiber, glass fiber, talc, wollastonite, mica, alumina, silica, and silicon carbide.

5. A method for forming prototype mechanical elements from at least one polymer material on a platform comprising the steps of:
    a) placing filament containing said polymer material comprising poly(2-ethyl-2-oxazoline) and an alcohol plasticizer, wherein the modulus of poly(2-ethyl-2-oxazonline) is decreased by the addition of the alcohol plasticizer, in a cylindrical housing having a throughbore with a diameter substantially equal to the diameter of the filament, said housing being connected with and attached to a discharge head member having a uniform diameter bore connecting with the throughbore, a discharge tip, a reduced diameter discharge opening in the tip, and a circumferential heater to liquefy the material in the bore;
    b) liquefying the material in the head member to thereby discharge a ribbon of material from the tip;
    c) transporting the platform in the x and y directions while discharging material thereon to form the cross sectional shape of the element; and
    d) transporting the housing and head member in the z direction simultaneously to form the element in elevation.

6. The method of claim 5 wherein the alcohol plasticizer is water soluble and comprises multiple hydroxyl groups.

7. The method of claim 5 wherein polar wax is added to the poly(2-ethyl-2-oxazoline) and alcohol plasticizer.

8. The method of claim 7 wherein the polar wax is selected from the group consisting of compounds having alcohol, acid, ester or amide functional groups.

9. The method of claim 5 wherein polar homopolymers and copolymers are added to the PEG plasticized poly(2-ethyl-2-oxazoline).

10. The method of claim 9 wherein the polar homopolymers and copolymers that are added to the PEG plasticized poly(2-ethyl-2-oxazoline) are from the group consisting of Nylon 12, amorphous nylon copolymer of terephthalamide/isophthalamide/hexamethylenediamine, Nylon 6/Nylon 12 copolymer, polyvinylformal, polyvinylbutyral, and polyesters.

11. Depositing a water-soluble thermoplastic composition as a ribbon of material to form a three-dimensional solid object, the composition forming the ribbon comprising poly(2-ethyl-2-oxazoline) and an inert filler.

* * * * *